United States Patent Office.

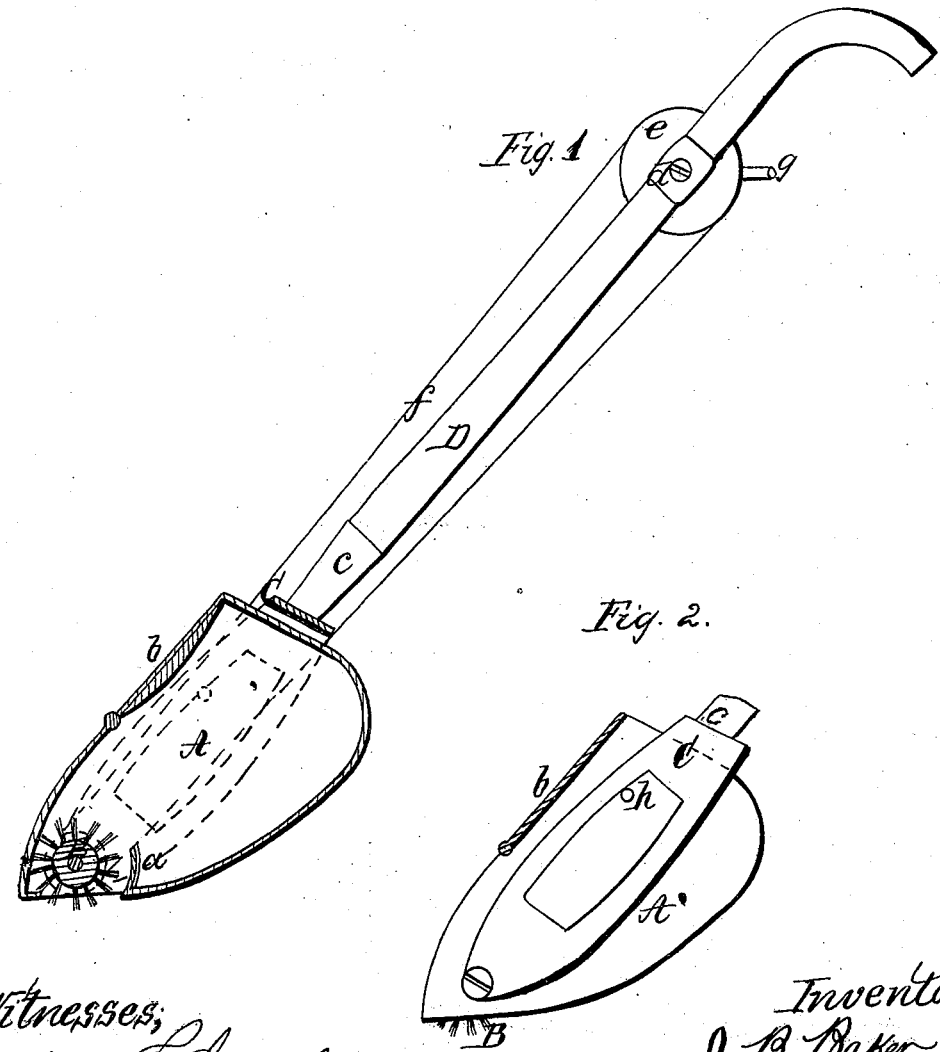

J. B. BAKER, OF SYRACUSE, NEW YORK, ASSIGNOR TO HIMSELF, HIRAM R. OLMSTED, AND RICHARD W. JONES, OF SAME PLACE.

Letters Patent No. 92,929, dated July 27, 1869.

IMPROVEMENT IN CARPET-SWEEPERS.

The Schedule referred to in these Letters Patent and making part of the same.

*To all whom it may concern:*

Be it known that I, J. B. BAKER, of Syracuse, in the county of Onondaga, and State of New York, have invented a new and useful Improvement in Carpet-Sweepers; and I do hereby declare the following to be a full, clear, and exact description of the same, sufficient to enable others skilled in the art to which my invention appertains, to make and use the same, reference being had to the accompanying drawing, forming part of this specification, and in which—

Figure 1 is a longitudinal section of my improved carpet-sweeper, and

Figure 2 is a side view of the box thereof.

This sweeper consists of a box in which a rotary brush is placed, and which is hung in a forked frame, provided with a handle having an adjustable collar carrying a pulley connected with a pulley on the brush-shaft by a belt, so that by rotating the pulley on the handle, the brush is revolved.

My invention will be fully understood from the following detail description of the drawing, in the two figures of which similar letters indicate corresponding parts.

A represents a box, made preferably of sheet-metal, and in about the form represented.

In the lower side of the box, near the front, is formed an opening, through which project the bristles of a rotary brush, B, fitted in suitable bearings in the side of the box.

*a* is a curved flange projecting from the bottom of the box at the rear of the brush-opening.

This flange prevents the escape of the sweepings from the receptacle in the lower part of the box.

*b* is a hinged lid covering an opening made in the top of the box for the removal of the sweepings.

C is a forked frame fitted loosely on to the projecting journals of the brush-shaft.

*c* is a socket attached to or formed with the frame C, and in it is fixed a handle, D.

On the handle D, a collar, *d*, is adjustably fitted. This collar is provided with a set-screw, by means of which it is held at any point on the handle.

The collar has a short shaft projecting at one side, on which a pulley, *e*, is mounted.

A belt, *f*, connects the pulley *e* with a pulley on the end of the brush-shaft.

The pulley *e* is rotated by means of a crank, *g*, attached to it.

This adjustable pulley constitutes an important feature of my invention, for by moving it back on the handle, the belt is tightened.

Another important feature will now be described.

The sides of the frame are slotted, as clearly shown in fig. 2.

These slots allow a limited movement of the box A, a pin, *h*, fixed in the side of the latter, projecting into the slot, and moving therein.

By this device, when the sweeper is raised from the floor, the box turns on its pivots and falls until the pin *h* strikes the lower side of the slot, thus preventing the escape of the sweepings from said box.

The operation of my sweeper will be readily understood.

The box is placed on the floor, as in fig. 1, and then pushed over the same, the crank being turned in the forward direction at all times, thereby rotating the brush, so as to thoroughly sweep the floor and deposit the sweepings in the receptacle.

The mode of connecting the handle-frame with the dust-box allows the handle to be raised and lowered without changing the position of the box.

Having thus described my invention,

What I claim as my invention, and desire to secure by Letters Patent, is—

1. The adjustable collar, carrying the driving-pulley, when constructed and arranged substantially as described, for the purpose of tightening the belt.

2. The combination of the dust-box A, rotary brush B, frame C, handle D, adjustable driving-pulley *e*, and band *f*, all constructed, arranged, and operating substantially as herein described.

J. B. BAKER.

Witnesses:
J. S. LEONARD,
J. N. STEVENS.